June 4, 1957     J. R. HOPKINS ET AL     2,794,483
PREFORMED PRODUCT FOR PROTECTING AND
COATING FIELD JOINTS OF PIPES
Filed Nov. 28, 1955
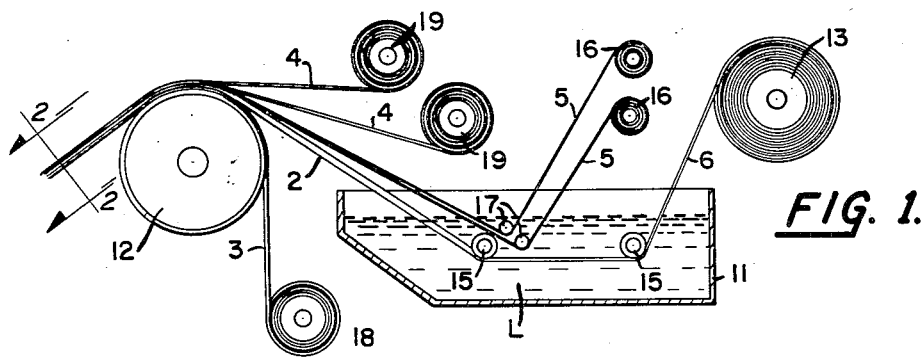
FIG. 1.
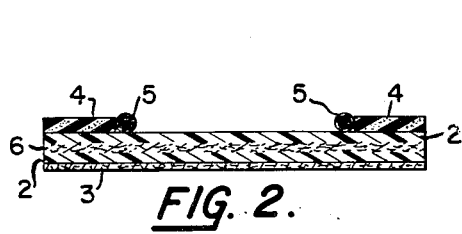
FIG. 2.
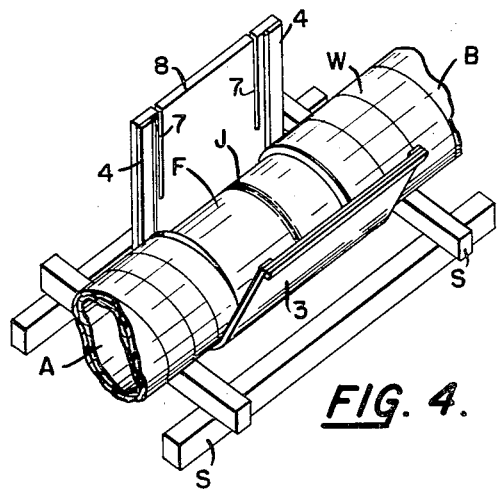
FIG. 4.
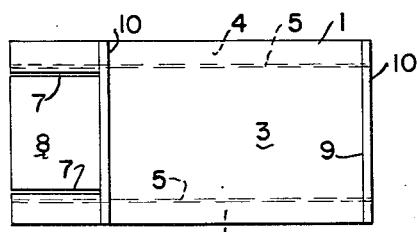
FIG. 3.
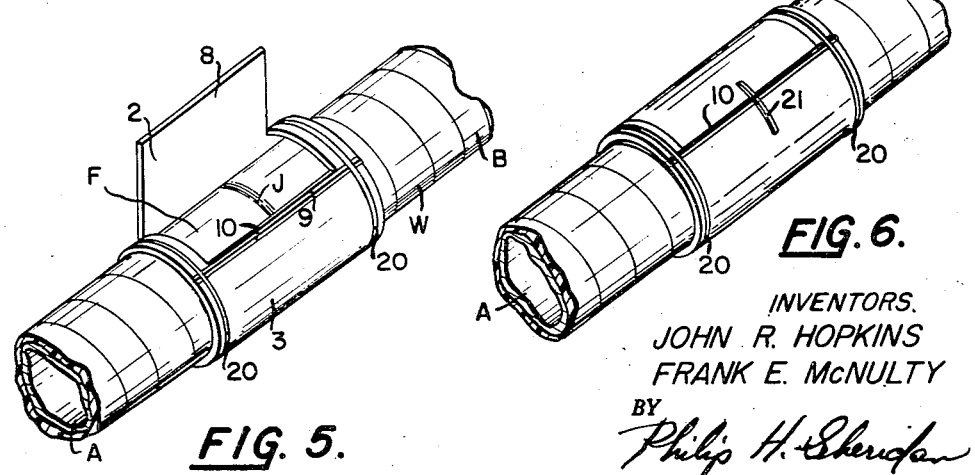
FIG. 5.
FIG. 6.
INVENTORS.
JOHN R. HOPKINS
FRANK E. McNULTY
BY Philip H. Sheridan
ATTORNEY United States Patent Office 2,794,483
Patented June 4, 1957

2,794,483

PREFORMED PRODUCT FOR PROTECTING AND COATING FIELD JOINTS OF PIPES

John R. Hopkins, Denver, Colo., and Frank E. McNulty, Tulsa, Okla.

Application November 28, 1955, Serial No. 549,253

4 Claims. (Cl. 154—41)

This invention relates to an improved product for protecting and coating cylindrical pipes and particularly "field joints" of pipe which is to be installed under ground, such as in pipe lines for transmitting fluid or gas from one point to another.

Pipe lines that are to be installed under ground by gas, oil and water companies are very often sent to a coating mill or yard where the pipe is cleaned, primed, coated and wrapped with hot applied coal tar coating, asphalt coating or a micro-crystalline wax coating. After the pipe is thus treated or coated it is referred to as "mill coated" or "yard coated" pipe. This coating, which will hereinafter be identified as the wrapping, may be reinforced and there are various specifications regarding the type and thickness of the coating material and the reinforcement. For a disclosure of suitable wrapping, attention is directed to U. S. patent application Serial No. 493,244, filed March 9, 1955, and entitled "Protective Coating for a Pipe or the Like and Cold Method of Applying Same."

To form such a pipe line, various sections of pipe have to be joined together and it has been the practice to so wrap all of each section in the manner described in said application, with the exception of about four to sixteen inches at the end of each pipe section, this range depending upon the diameter of the pipe. The practice of leaving the ends uncoated is followed by the majority of coating applicators and the length of uncoated section is often specified. The sections are usually joined by welding and if the wrapping were applied at the ends of the pipe, then the heat from welding would precipitate back into the pipe and cause the wrapping adjacent the ends of each section to melt. This latter action would result in poor and difficult welding and the wrapping adjacent the weld would become so hot that portions of it would be destroyed by run-off onto the ground and the remaining portions would often burn and cause considerable expense in rewelding, cleaning and recoating. Therefore, the practice has been to leave certain areas of the ends of each pipe section uncoated and these areas are known in the trade as "cut backs." When the two pieces of pipe are welded together, the weld and the two abutting cut-backs are always referred to as a "field joint" and this terminology will be used hereinafter in describing the present invention and defining the invention by the appended claims.

Many gas, oil and water companies require the contractor or their own personnel to heat up the same type of basic material which forms the wrapping for the majority of each pipe section and to pour this coating material, which would be compatible with the wrapping, over the field joint. Such practice is and has been extremely difficult and inefficient and it is quite a task to get an even amount of coating over the field joint and the end results provide a rather poor quality of coating on the field joint. Furthermore, the practice of pouring material, such as hot tar, asphalt or wax, over the field joint involves considerable expense, due to the fact that most of the coating material runs off the pipe onto the ground where it is difficult, if not impossible, to reclaim. Also, it is preferable to have reinforcement, such as glass mat or woven glass fabric, at the field joint and this is a difficult and impractical operation as the poured material will solidify so rapidly it is impossible to properly embed the reinforcement therein.

The present invention is concerned with the provision of an improved protective coating comprising a product that is preformed so that the coating applicator may wrap the product around the field joint and pour hot coating over the field joint without losing any coating from spillage. Such a preformed product, which together with the poured material forms a reinforced coating for the joint, is very economical to manufacture and with the method involved in applying the article to the field joint, a suitable reinforced coating over the field joint and entire pipe is obtained.

With the above in mind, it is an object of this invention to provide an improved preformed product that may be used in coating a field joint of two abutting sections of pipe.

Another object of this invention is to provide an improved preformed product for use as a mold when pouring hot coatings on field joints of yard or mill coated pipe.

A further object resides in an improved method and product for coating a field joint of pipe sections which overcomes the difficulties of the prior art and which will permit application of the coating to be carried out quickly and efficiently and at a minimum of cost without requiring extensive pipe line machinery and crews and when applied will remain firmly sealed to the field joint and to the previously applied wrapping adjacent the joint.

It is also an object of the invention to provide a product of the type described which permits the use of a minimum amount of hot poured material when applying same to a field joint.

Finally, it is also an object of the invention to provide a preformed product for use in coating field joints which has embedded therein suitable reinforcing means.

Other objects and advantages of the invention will become apparent upon considering the following detailed description in conjunction with the drawings wherein like numerals represent similar parts throughout and wherein:

Figure 1 is a diagrammatic view illustrating a convenient apparatus for producing a partially completed preformed product;

Figure 2 is a view taken along the lines 2—2 of Figure 1 of a product produced by the apparatus of Figure 1;

Figure 3 is a back plan view of a completed preformed product of this invention;

Figure 4 is a perspective view illustrating the product of Figure 3 about to be applied to a field joint;

Figure 5 is a perspective view illustrating the preformed product partially applied to a field joint; and Figure 6 is a perspective view showing the field joint coated with the preformed product.

Referring in detail to the drawings wherein a typical product is illustrated, it will be understood, of course, that the size of the preformed product and in some instances the final construction thereof will be dictated by the size of the field joint being coated. A typical completed product 1 is illustrated in Figure 3 and Figure 2 depicts the construction of this product partially completed and as it leaves the assembly apparatus of Figure 1. This product includes a main layer of sheet material 2, a backing layer 3, cushion layers or gaskets 4 and spacer means 5. As will be hereinafter pointed out, the product 1 is formed by any suitable means such as the technic illustrated in Figure 1.

The layer 2 preferably consists of a material having a main constituent compatible with or identical to the essential ingredient of wrapping W shown in Figures 4, 5 and 6, this being the yard or mill coating. The wrapping W is preferably the coating roll described and claimed in my said patent application. Therefore, it may be assumed that layer 2 essentially consists of a normally non-tacky, high melting material such as coal tar, asphalt or micro-crystalline wax. The reinforcement 6 embedded within such bituminous material or wax may be, as described in my said application, an inorganic sheet material of woven glass fabric but preferably, due to the expense, well known glass mat 6 may be employed as the embedded reinforcement. Such mat generally consists of glass fibers dispersed at random within a resin binder and parallel reinforcement in the form of yarn strands extending longitudinally through the mat, the product known in the trade as "Coromat," manufactured by Owens-Corning Fiberglas Corporation, being a suitable one for use as reinforcement 6. The backing layer 3 preferably consists of laminated kraft board or other multiple layer paper, but if desired other suitable outer reinforcement may be used such as a layer of asbestos felt. Element 4 preferably is foam rubber, but instead thereof there may be used well known paddings such as those of the Ozite type or felt wool. Spacer means 5 may be any suitable cheap rubber, rope or twine, although a sisal twine is preferred and, of course, the spacer means may assume any configuration such as round or square, although it should extend from the layer 2 a distance at least as great and preferably greater than element 4.

The description thus far covers the partially completed product 1 as it leaves the assembly apparatus of Figure 1. Next, following solidifying, the product is cut to the desired size, such as shown in Figure 3, and two spaced apart slits 7 are formed at one end of the sheet layer 2 to form the flap 8. Thereafter, for a purpose which will hereinafter be described, it is desirable, especially when the product 1 is to be used for substantial sized pipe, to apply, by any suitable means such as tacks, at the opposite end 9 and adjacent the flap bottom thin strips of wood 10 or the like. It is noted that the strips 10 are applied on the back side of the product and they need be of such strength only to have reasonable resistance to bowing. The product 1 now is completed and ready for use to coat a field joint F illustrated in Figures 4, 5 and 6.

Considering Figure 1, numeral 11 represents a suitable receptacle for containing a liquid-like bath L of, for example, coal tar, asphalt or micro-crystalline wax, preferably at a temperature in the order of 400 degrees F. The various layers used to form product 1 are assembled about conveyor roll 12 in a well known manner and thereafter desired sizes of the product are allowed to dry and solidify and thereafter are cut by standard means to desired sizes. Of course, the width of product 1 may be varied as desired by means that should be obvious hereinafter. Let us assume that the product 1 is to be of the preferred type mentioned and that the essential ingredient of wrapper W is coal tar in which case the liquid L within container 11 would also preferably be hot coal tar. From the supply roll 13 there passes a strip of glass mat 14 through the bath L and, of course, during travel of this mat through the bath suitable guide or idler rolls 15 are provided. The thickness of the coal tar L that accumulates on the glass mat, as explained in my said pending application, is controlled by the temperature of the bath L and the duration of the mat in the bath as it travels therethrough. In any event, it should be appreciated that the layer 2 as it leaves the bath will essentially consist of coal tar embedded with a strong and durable reinforcement. Two strands of sisal twine 5 also travel from their rolls 16, or from boxes and conventional feeding means, through the bath L and are arranged to be guided over guide rolls 17 so that they are positioned on the layer 2 in suitable spaced relation, such as shown in Figure 2. It is desirable to coat the twine with the hot liquid L as such coating waterproofs the twine, protects it from deterioration when placed beneath the ground and provides additional basis for adhering to layer 2. As should be apparent, the backing layer 3 of kraft paper travels to the conveyor roll 12 from supply roll 18 and the gaskets 4 likewise travel to the conveyor roll, but in spaced relation, from rolls 19. It should be obvious that the backing layer 3, as well as the gaskets 4 and the coated twine 5, are caused to adhere to the main layer 2 due to the adhesive qualities of the liquid L.

Before explaining in detail the functions of the various parts of product 1, it will be understood that this field joint F is formed by two pipe sections A and B having their ends welded together at joint J and the part of the field joint F that is not wrapped by wrapping W constitutes the cut backs of the joint. To apply the product of Figure 3 it is first necessary to raise the field joint from the surface of the ground or from the bottom of the trench where the pipe is being laid or repaired and this may be done by any suitable means, such as supporting skids or stands S beneath each pipe section. In actual practice the skids S are positioned alongside of the trench preparatory to moving the pipe into the trench. The applicators then take hold of each end of the product 1 and position it underneath the field joint, as shown in Figure 4, and the product should be of such width that the spacer means 5 and the gasket 4 at each side thereof underlies the ends of the wrappings W, that is, the wrapping next adjacent the cut backs. Next, the applicators cause the product to fit around the joint, as illustrated in Figure 4, and while holding the preformed product in this position support bands or strips 20 are applied at each end by any suitable means, such as well known crimping and tensioning tools for affixing steel bands if the latter are of this type.

With the product positioned in place, the operators may raise the flap 8 as shown in Figure 4 and this forms a trough for pouring hot material onto the field joint F. It is very important to note that in this condition the layer 2 and the backing 3 will be spaced a distance from the field joint substantially equal to the diameter of twine 5 and the thickness of wrapping W over which the twine and spacing means 4 is secured.

At this time the operators pour hot liquid L on the joint adjacent the flap 8 and the liquid poured at this point will travel all the way around the field joint F and following this the flap is pulled down to form the seal as illustrated in Figure 5. The liquid tar being poured could readily cause the product 1 adjacent end 9 and the bottom of flap 8 to bow outwardly with respect to joint F. To prevent this is the purpose of strips 10 and thereby a substantially even layer of liquid tar around joint F is achieved. Of course, when only a small amount of liquid pouring is required by the customer or the joint F is small, then the strips 10 are not necessary. The liquid naturally adheres to the field joint and also, due to chemical compatibility, with the stable layer 2 and until the liquid is dry it is probably preferable to utilize some sort of means 21 to maintain the flap 8 in closed position. This latter means may be a part of the product 1 or separate therefrom and take the form of any pressure sensitive tape 21 as shown in Figure 6.

It has been implied that foam rubber 4 functions as a spacer and this is true, but these strips on the product 1 also have several other advantages, namely, they each function as a gasket to prevent run-out of the poured liquid, and each acts as a cushion so that the bands 20 applied will not cut into or damage the reasonably rigid and stable layer 2. Spacing means is necessary so that the poured tar will be able to flow completely about the field joint and to insure this spacing means is the only reason for utilizing the twine or other rope 5. In using steel bands 20 it is to be assumed that the field joint F illustrated is of quite a large size. In the event smaller field joints are being coated, instead of the steel bands to secure the preformed product in position, there may be employed bands of other material, such as pressure sensitive tapes or glass reinforced tapes. To insure that the liquid coating poured adjacent the flap 8 travels around the field joint, the end 9 of the formed member 1 is preferably positioned on the field joint adjacent the top thereof. As to the backing layer 3, the main purpose thereof, in addition to providing strength, is to prevent damage to the field joint coating during back filling after the pipe line is assembled or repaired in the trench.

It should be noted that due to the seal formed by gaskets 4, a minimum amount of liquid L is required to cover the field joint and further, in view of the compatibility of the layer 2 with the liquid poured, it is necessary to use very little liquid since the majority of the coating that will surround the field joint is a part of the preformed product. However, the amount of liquid L used depends on the customer's specifications.

As illustrated, the flap 8, when closed as in Figure 6, is of a size to directly abut end 9 so that there is provided a substantially flush joint. However, it is preferable in many instances to have this flap overlap end 9 and this may be accomplished by regulating the size of formed product 1 and cutting away the tips of the gasket and rope legs formed by slits 7 whereby the flap will extend slightly beyond these tips.

It is believed from the foregoing that the relatively rigid product 1 and the method of application thereof to a field joint F or the like fully accomplished the objects and advantages outlined. Being aware of the possibility of equivalent modifications in the product and method described, we desire it to be understood that the scope of our invention is not to be limited except in accordance with the appended claims.

In the claims, the term "field joint" is intended to cover its true meaning as well as other portions of a pipe line needing a coating, such as an area to be repaired.

We claim:

1. A preformed product for use in coating a field joint of a pipe line having a coating previously applied thereto except at the field joint comprising a relatively rigid body portion including material chemically compatible with the previously applied coating, said body portion having top and bottom surfaces and sides and ends sufficient in size to be wrapped about the field joint, unitary means on the top surface for spacing the body portion from the field joint when it is wrapped therearound whereby a flowable material having an affinity to the body portion and previously applied coating may be received in the spacing, one end of said body portion being slit at spaced intervals to provide a flap permitting the flowable material to be poured within the spacing when the body portion is wrapped, the bottom surface including unitary means for preventing bowing of the body portion when the latter is wrapped.

2. A product as defined in claim 1 wherein the unitary means on the bottom surface comprise sufficiently rigid strips of material mounted transversely of the body portion adjacent the bottom of the flap and adjacent the end opposite the flap.

3. A product as defined in claim 1 wherein said body portion has applied to its bottom surface a layer of backing material to provide additional strength and to prevent damage to the body portion.

4. A product as defined in claim 2 wherein said unitary spacing means comprises spaced apart gasket members integral on the top surface and extending along the sides from end to end, each gasket member also functioning to provide a seal for the flowable material, and said spacing means further includes strip elements integrally mounted on the top surface immediately adjacent each gasket member on the side thereof remote from the sides of the body portion.

References Cited in the file of this patent

UNITED STATES PATENTS

| | | |
|---|---|---|
| 1,411,386 | Sodergreen | Apr. 4, 1922 |
| 1,722,324 | Deming | July 30, 1929 |
| 2,024,602 | Roberts | Dec. 17, 1935 |
| 2,713,551 | Kennedy | July 19, 1955 |
| 2,751,236 | Wyatt | June 19, 1956 |